United States Patent

Hamann et al.

[11] Patent Number: 5,816,763
[45] Date of Patent: Oct. 6, 1998

[54] APPARATUS FOR TRANSPORTING MOBILITY DEVICES AND METHOD THEREFOR

[75] Inventors: Bernard J. Hamann, Apache Junction; Michael Shaw, Scottsdale, both of Ariz.

[73] Assignee: Mobility Cart Lifts, LLC, Mesa, Ariz.

[21] Appl. No.: 855,494

[22] Filed: May 13, 1997

[51] Int. Cl.⁶ .................................................. B60R 9/042
[52] U.S. Cl. ........................ 414/462; 414/786; 414/921
[58] Field of Search .................................. 414/540, 545, 414/462, 786, 921

[56] References Cited

U.S. PATENT DOCUMENTS

| | | | |
|---|---|---|---|
| 4,213,729 | 7/1980 | Cowles et al. ........................ | 414/462 |
| 4,705,448 | 11/1987 | Mungons ............................... | 414/462 |
| 4,741,660 | 5/1988 | Kent ..................................... | 414/540 X |
| 5,011,361 | 4/1991 | Peterson .............................. | 414/545 X |
| 5,122,024 | 6/1992 | Stokes ................................. | 414/921 X |
| 5,388,937 | 2/1995 | Farsai .................................. | 414/921 X |
| 5,421,692 | 6/1995 | Varrichio et al. ................... | 414/921 X |
| 5,431,522 | 7/1995 | Ross .................................... | 414/540 X |

*Primary Examiner*—David A. Bucci
*Attorney, Agent, or Firm*—Harry M. Weiss; Jeffrey D. Moy; Harry M. Weiss & Associates, P.C.

[57] ABSTRACT

The present invention is directed to an apparatus and method for safely transporting mobility devices on the rear of a motor vehicle. The apparatus and method includes wheel wells to receive the drive wheels of the mobility device, and L-shaped members which automatically retain the undercarriage of the mobility device when it is being lifted into position for transport and which automatically disengage from the undercarriage when the mobility device is being lowered to the ground for unloading.

18 Claims, 5 Drawing Sheets

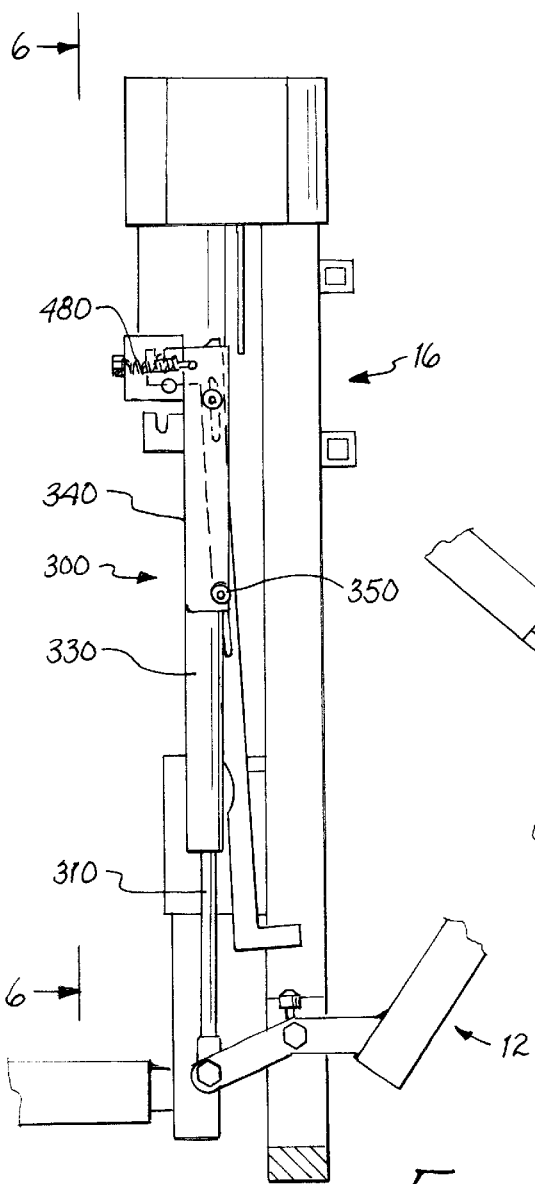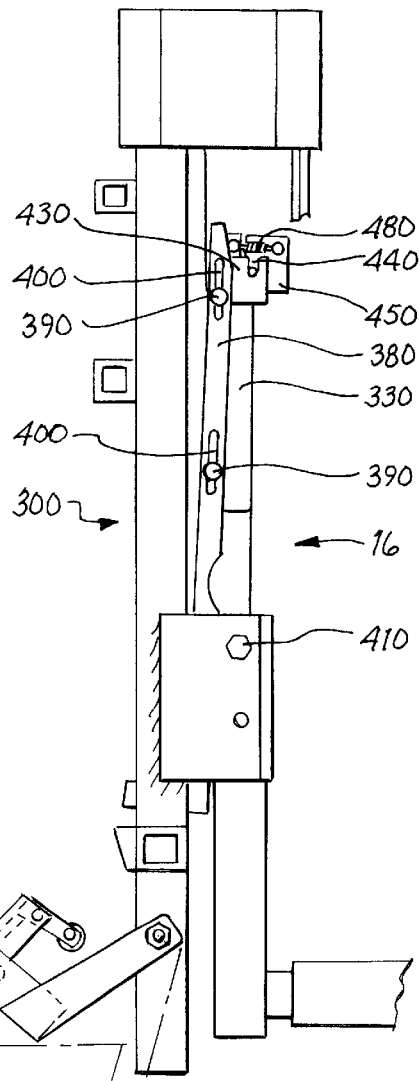
FIG. 4
FIG. 3

APPARATUS FOR TRANSPORTING MOBILITY DEVICES AND METHOD THEREFOR

BACKGROUND OF THE INVENTION

FIELD OF THE INVENTION

This invention relates generally to an apparatus and method for transporting mobility devices and, more specifically, to an apparatus and method for transporting mobility devices on the back of a vehicle in a secure and convenient manner.

BACKGROUND OF THE INVENTION

In recent years, a variety of electric scooters, power wheelchairs, and other mobility devices have been developed. The purpose of these devices is to provide mobility-restricted individuals with greater mobility and freedom. One popular chair is the JAZZY®, manufactured in several models by Pride Health Care. There are currently several apparatuses which have been developed to lift and transport mobility devices, including apparatuses which are designed to be mounted on the rear of a vehicle.

Generally, these prior art apparatuses provide a platform, upon which the mobility device is loaded, with the device's drive wheels resting on top of the platform. Where the device is a power chair, it is generally manually secured to the platform with straps or ties of some kind. This method of securing the power chair can be demanding physically, and is not entirely secure.

Therefore, a need existed for an apparatus and method for efficiently loading and transporting mobility devices. The improved apparatus and method must allow the user of the mobility device or the user's companion to readily drive the device onto the apparatus, and must automatically secure the device into position without requiring the use of straps or other manual techniques.

SUMMARY OF THE INVENTION

It is an object of the present invention to provide an improved automobile-mounted apparatus for transporting mobility devices and method therefor.

It is another object of the present invention to provide an apparatus and method for transporting mobility devices that will automatically center and retain the main drive wheels of the device for transport.

It is a further object of the present invention to provide an apparatus and method for transporting mobility devices that will automatically secure the device for transport.

BRIEF DESCRIPTION OF THE PREFERRED EMBODIMENTS

In accordance with one embodiment of the present invention, an apparatus for transporting mobility devices is disclosed. The apparatus is comprised of a mobility device having two relatively large wheels; a support platform for the mobility device comprising: loading means for permitting the mobility device to be located on the support platform; first and second wheel wells located between the loading means, the first and second wheel wells each having a width greater than a width of each of the relatively large wheels; means located within each of the first and second wheel wells for substantially centering the relatively large wheels; and retaining means for retaining a bottom portion of the mobility device to the support platform; lifting means attached to the support platform proximate the first wheel well for lifting the support platform; and means for attaching the lifting means to a vehicle.

In accordance with another embodiment of the present invention, an apparatus for transporting mobility devices is disclosed. The apparatus is comprised of a mobility device having two relatively large wheels and at least two relatively small safety wheels; a support platform for the mobility device comprising: loading means for permitting the mobility device to be located on the support platform the loading means comprising: a first pair of ramp members substantially aligned with the first and second wheel wells on a first side of the support platform wherein each of the ramp members is aligned with one of the two relatively large wheels and one of the at least two relatively small wheels; a second pair of ramp members substantially aligned with the first and second wheel wells on a second side of the support platform wherein each of the ramp members is aligned with one of the two relatively large wheels and one of the at least two relatively small wheels; and path means joining the first and second pairs of ramp members for permitting the relatively small wheels to pass adjacent the first and second wheel wells during loading and unloading of the mobility device; first and second rectangle-shaped wheel wells located between the loading means, the first wheel well having a width of between about three inches and about three and one-half inches and the second wheel well having a width of between about three and three-quarters inches and about four and one-quarter inches; means located within each of the first and second wheel wells for substantially centering the drive wheels; the centering means comprising a pair of substantially stirrup-shaped members rotatably coupled to the support platform and located proximate short sides of the wheel wells and spring means for maintaining the stirrup-shaped members in a substantially horizontal position when the relatively large wheels are not present in the wheel wells and to maintain the stirrup-shaped members in contact with the relatively large wheels when the relatively large wheels are present in the wheel wells; retaining means for retaining a bottom portion of the mobility device to the support platform; the retaining means comprising at least one substantially L-shaped member rotatably coupled to the support platform; the substantially L-shaped member dimensioned to retain a bottom portion of the mobility device; and rotation means coupled to the at least one substantially L-shaped member for rotating the L-shaped member from a position substantially parallel to the support platform to a substantially ninety degree angle relative to the support platform wherein the L-shaped member retains the bottom portion of the mobility device; a plurality of eyelets; lifting means attached to the support platform proximate the first wheel well for lifting the support platform; means for automatically rotating the support platform toward the lifting means when the support platform is raised without a mobility device being located thereon; and means for attaching the lifting means to a vehicle.

In accordance with still another embodiment of the present invention, an improved method for transporting mobility devices is disclosed. The method comprises the steps of: providing a mobility device having two relatively large wheels; providing a support platform for the mobility device comprising: loading means for permitting the mobility device to be located on the support platform; first and second wheel wells located between the loading means, the first and second wheel wells each having a width greater than a width of each of the relatively large wheels; means located within each of the first and second wheel wells for substantially centering the relatively large wheels; and retaining means for retaining a bottom portion of the mobility device to the support platform; providing lifting means attached to the support platform proximate the first wheel well for lifting the support platform; and providing means for attaching the lifting means to a vehicle.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 3 is a side view of the lifting apparatus portion of the transporting apparatus of FIG. 2 taken along line 3—3.

FIG. 4 is a side view of the lifting apparatus portion of the transporting apparatus of FIG. 2 taken along line 4—4.

DETAILED DESCRIPTION OF THE PREFERRED EMBODIMENTS

Figure 1:
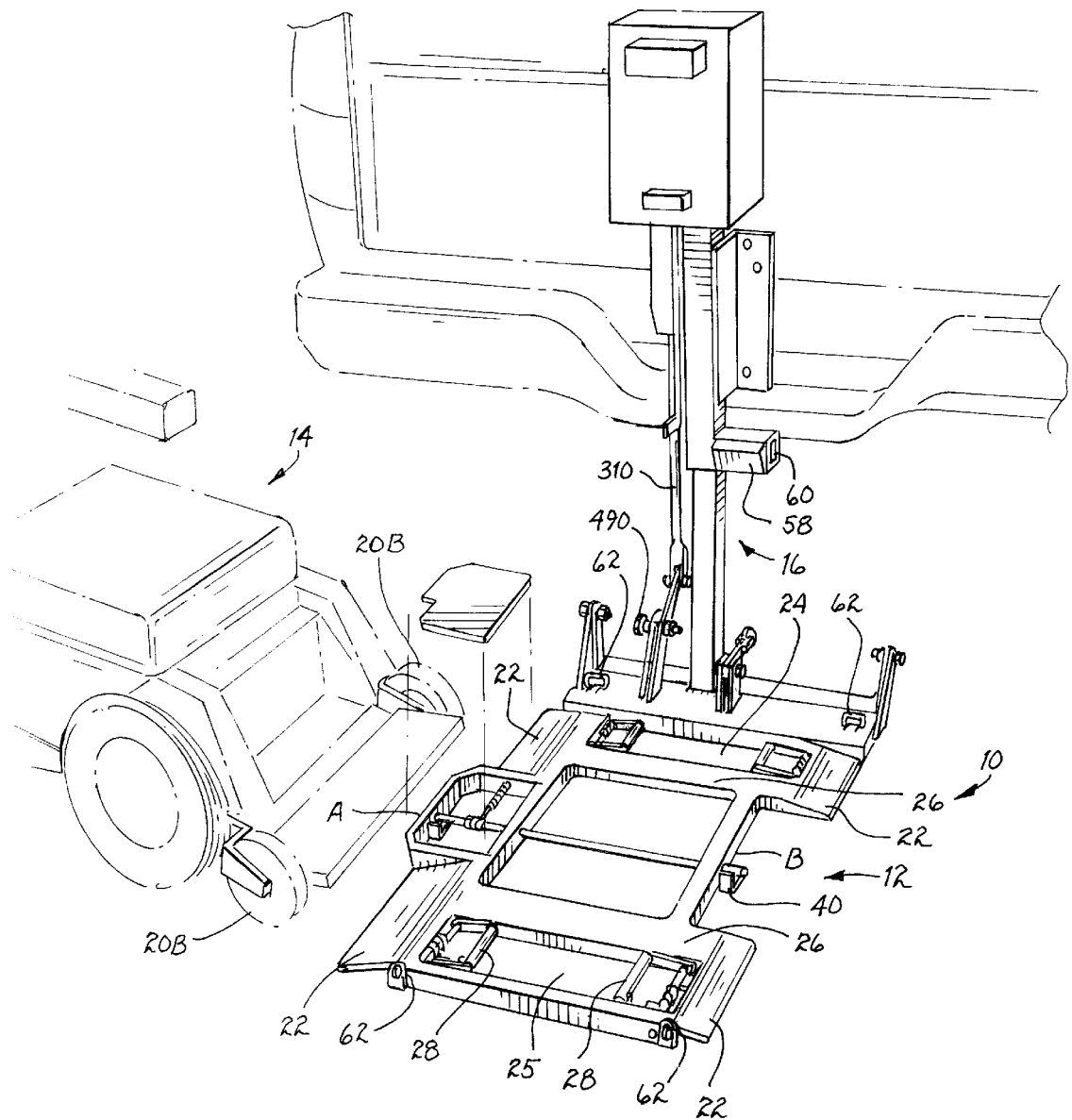
FIG. 1 is a perspective view of the preferred embodiment of the mobility device transporting apparatus of the present invention, shown coupled to a vehicle and with a mobility device in position to be loaded onto the support platform of the apparatus.
Figure 2:
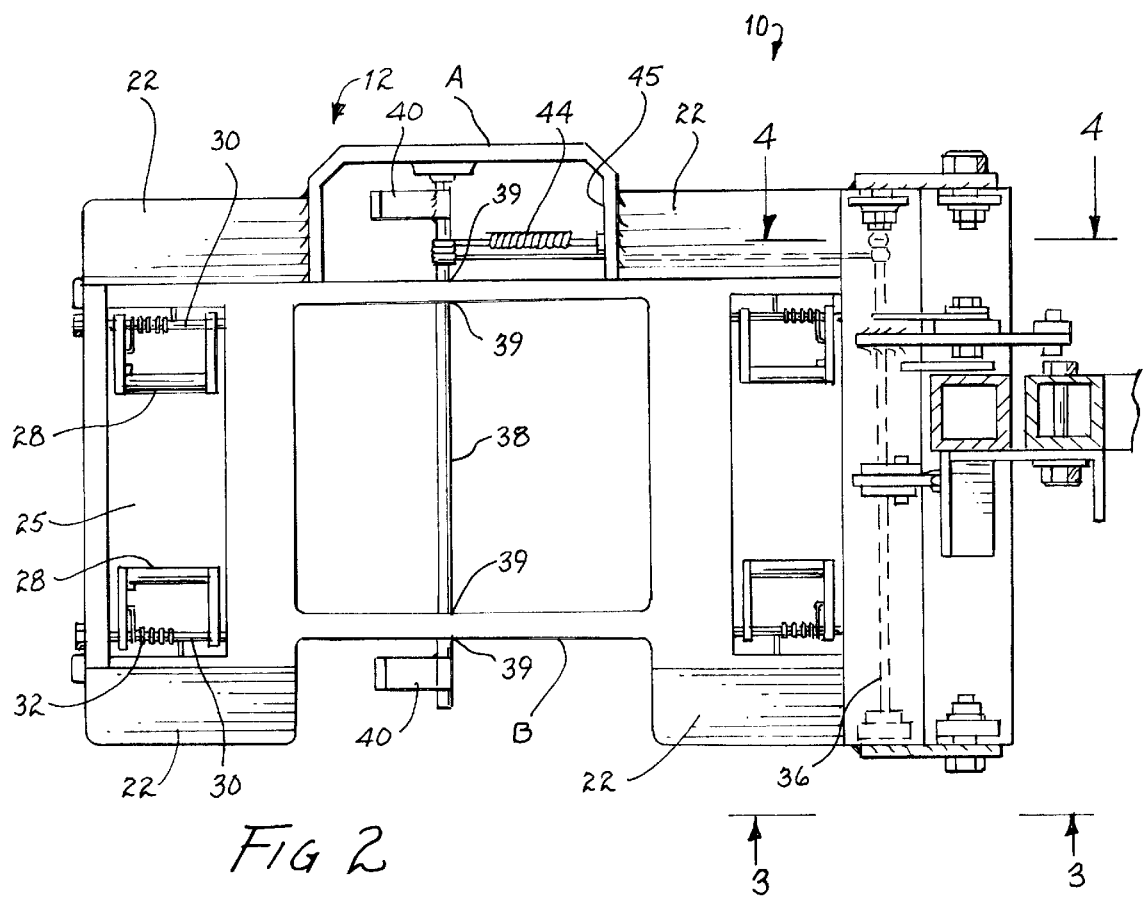
FIG. 2 is a top view of the mobility device transporting apparatus of the present invention.
Figure 5:
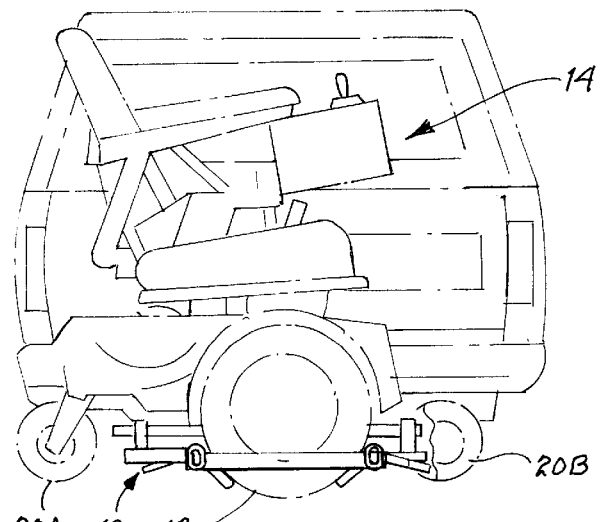
FIG. 5 is a front view of the transporting apparatus of the present invention, shown coupled to a vehicle and with a mobility device loaded onto the support platform of the apparatus.

Referring to the embodiment of FIGS. 1 and 2, reference number 10 refers generally to the transport apparatus of this invention. Reference number 12 refers generally to the platform of the present invention, which platform receives a mobility device 14 as shown in FIGS. 1 and 5. Reference number 16 refers generally to the lifting apparatus of the present invention. As shown in FIGS. 1 and 5, the mobility device 14 comprises two drive wheels 18 (only one of which is shown), two support wheels 20A positioned to the rear of the drive wheels 18, and two anti-tip wheels 20B positioned to the front of the drive wheels 18.

Referring specifically to FIGS. 1 and 2, the platform 12 comprises a pair of ramps 22 on a first side A of the platform 12, and a pair of ramps 22 on a second side B of the platform 12, each of which ramps 22 is wide enough to accommodate the drive wheel 18 and support wheels 20A that are in alignment with the respective ramp 22. The ramps 22 permit a mobility device 14 to drive onto the platform 12 from side A and to drive off of the platform 12 from either side A or side B.

Located between each opposing pair of support ramps 22 is a first drive wheel well 24 and a second drive wheel well 25. Adjacent each drive wheel well 24 and 25 and parallel thereto, on the side nearest the center of the platform 12, is a support wheel path 26. The support wheel path 26 allows the support wheels 20A to travel over the platform 12 during loading and unloading. Preferably, when the transport apparatus 10 of the present invention is being used with a JAZZY® power chair, wheel well 24 should have a width of approximately three and one-quarter inches, and wheel well 25 should have a width of about four inches, to allow the platform to lower fully without binding on the drive wheels 18 as they touch the ground. In particular, by making wheel well 25 wider than wheel well 24, it is possible to reduce, if not eliminate, the tendency of the drive wheel 18 located in the wheel well 25 to rub on the inside of the wheel well 25 during lowering of the platform 12. While the width of the wheel wells 24 and 25 can be altered without departing from the spirit or scope of the invention, a sizing of the wheel wells 24 and 25 that is too large may result in the mobility device 14 swivelling within the wheel wells 24 and 25, preventing the latching apparatus (described below) from functioning properly.

Located at each of the short sides of the wheel wells 24 and 25 are centering devices 28, which centering devices 28 are substantially stirrup-shaped. The centering devices 28 rotate about shafts 30, with such rotation being limited by torsion springs 32 which are attached about shafts 30 and which connect a side member of each center device 28 to the nearest short side of the respective wheel wells 24 and 25, as shown in FIG. 2. The torsion springs cause the centering devices 28 to maintain a position that is substantially parallel to the support wheel paths 26, and thus prevent the centering devices 28 from hanging below the plane of the platform 12 when the transport apparatus 10 is not in use. When a mobility device 14 is located on the platform 12 so that the drive wheels 18 are located in the wheel wells 24 and 25, the drive wheels 18 rest on the centering devices 28, and the centering devices 28 substantially center the drive wheels 18 within their respective wheel wells. Additionally, the centering devices 28 provide an easier exit and entrance of the mobility device 14 by providing a ramp effect and thereby limiting the amount of drop when the drive wheels 18 enter the wheel wells 24 and 25.

Figure 7:
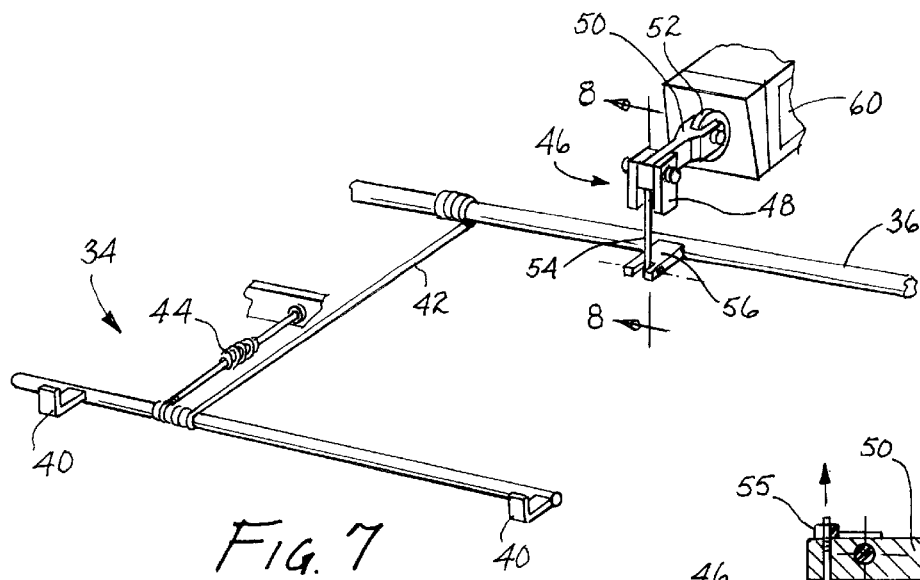
FIG. 7 is a cut-away view of the latching mechanism of the present invention.

Referring specifically to FIG. 7, the automatic latching apparatus 34 of the transport apparatus 10 is shown. The latching apparatus 34 comprises a first shaft 36, preferably having a diameter of three-fourths of one inch, and a second shaft 38 substantially parallel to the first shaft 36, and preferably having a diameter of one-half of one inch. The first shaft 36 is rotatably mounted at both ends to the platform 12, as shown in FIG. 2. The second shaft 38 is rotatably mounted at one end to the platform 12, as shown in FIG. 2, and passes through openings 39 in the platform 12. Proximate both ends of the second shaft 38 are L-shaped latches 40, which latches 40 can be made of flat stock, metal rods, or any other appropriate material. A cable 42 is wound around each of the first shaft 36 and the second shaft 38. One end of the cable 42 is connected to the first shaft 36, while the second end of the cable 42 is connected to a spring 44, which spring 44 is attached to a wall 45 that abuts the support ramp 22 located on side A of the platform 12 as shown in FIG. 2. The spring 44 provides tension during the automatic latching and unlatching of the mobility device 14.

Figure 8:
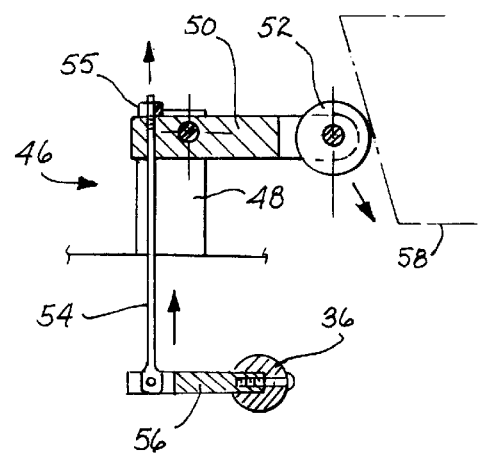
FIG. 8 is a cross-sectional view of a portion of the latching mechanism of the present invention taken along line 8—8 of FIG. 7.
Figure 6:
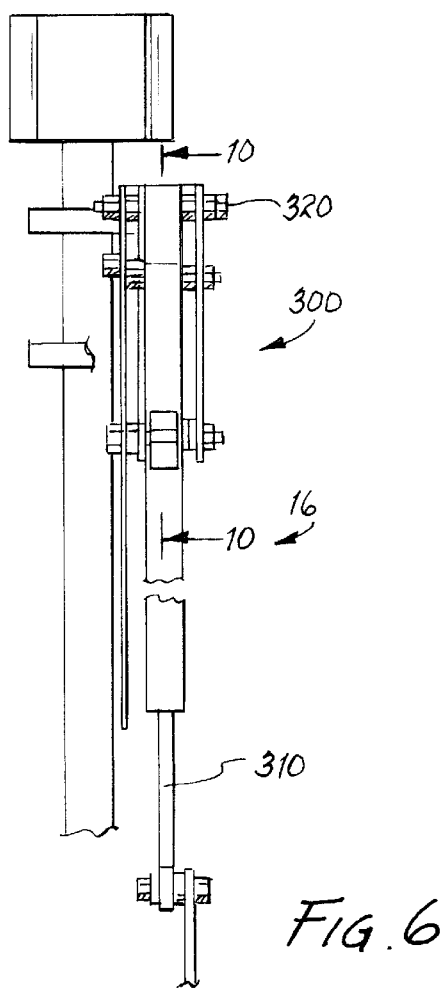
FIG. 6 is a view of the lifting apparatus portion of the transporting apparatus of the present invention taken along line 66 of FIG. 4.

Referring specifically to FIGS. 7 and 8, located along first shaft 36 is a latch engaging mechanism 46. The latch engaging mechanism 46 is substantially L-shaped, with a base member 48 comprising a pair of opposing rectangle-shaped members, an arm member 50 which is rotatably coupled to the base member 48, and a wheel 52 which is rotatably coupled to the arm member 50. Adjustably connected at substantially a ninety degree angle to arm member 50 distal the wheel 52 is a push rod 54. The end of the push rod 54 that is adjustably connected to the arm 50 is threaded, and the push rod 54 is adjustably connected to the arm 50 with a nut 55. The length of the push rod 54 below the arm 50 determines the amount of travel of the latches 40. That length can be adjusted with the nut 55. The second end of the push rod 54 is rotatably connected to a substantially Y-shaped member 56, which extends from and is fixedly connected to the first shaft 36, and which Y-shaped member 56 is substantially parallel to the arm member 50.

Referring to FIGS. 1 and 5, the lifting apparatus 16 is capable of lowering the platform 12 to a position adjacent the ground, so that a mobility device 14 may be safely driven onto or off of the platform 12. The lifting apparatus 16 is also capable of lifting the platform 12, with a mobility device 14 located thereon, until the platform 12 is at a height above the ground that is safe for travel. As shown in FIGS. 3 and 4, if no mobility device 14 is located on the platform 12, then the transport apparatus 10 will "fold" by causing the platform 12 to automatically move toward the lifting apparatus 16, until the platform 12 and the lifting apparatus 16 are nearly in contact with each other. Prior art machines have the capability of automatically "folding" in this manner.

When a mobility device 14 is located on the platform 12, the platform 12 will remain at substantially a ninety degree angle relative to the lifting apparatus 16 while the platform 12 is lifted to a height that is safe for travel, as shown in FIG. 1. As shown in FIGS. 7 and 8, as the platform 12 is being lifted, the wheel 52 will contact an angled face 58, which angled face 58 is located at one end of a body 60, which is attached at a second end at substantially a ninety degree angle relative to the lifting apparatus 16. As the wheel 52 moves upward along the angled face 58, the arm member 50 will rotate toward the push rod 54, causing the first shaft 36 to turn. That turning, which is communicated through cable 42 to the second shaft 38, causes the second shaft 38 and thus the L-shaped members 40 to turn in a clockwise direction. The L-shaped members 40 will continue to turn until the short ends of the L-shaped members 40 pass over a portion of the undercarriage (not shown) of the mobility device 14, thereby retaining the mobility device 14 in position. The L-shaped members 40 may not actually contact the undercarriage of the mobility device 14; rather, the short ends are positioned over the undercarriage so as to prevent it from lifting up from the platform 12 during travel.

A plurality of eyelets 62 may be attached to the platform 12 as shown in FIG. 1, to provide fastening locations for bungee cords or other similar devices, used to further secure the mobility device 14 to the platform 12 if desired.

Figure 9:
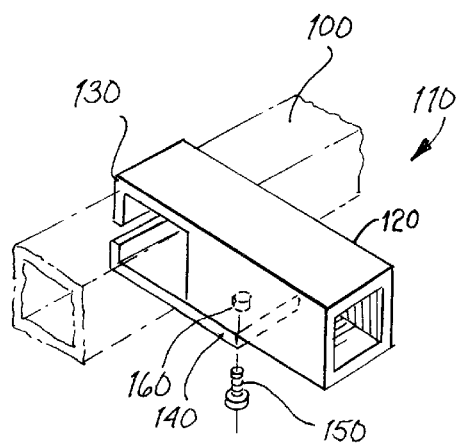
FIG. 9 is a perspective view of one embodiment of an adapter for the transporting apparatus of the present invention.
Figure 11:
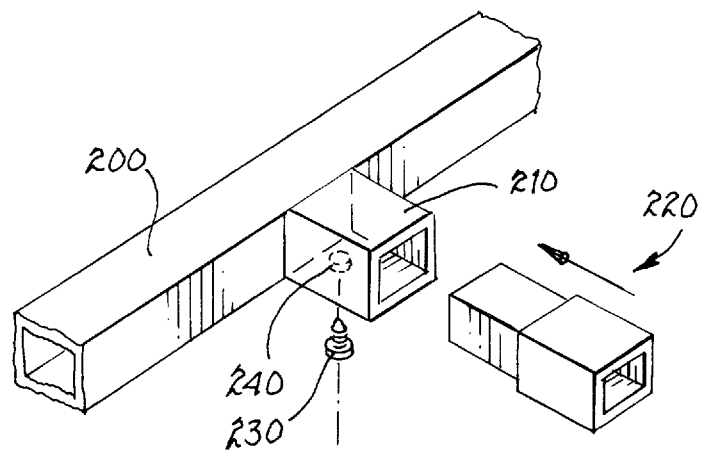
FIG. 11 is a perspective view of another embodiment of an adapter for the transporting apparatus of the present invention.

Referring to FIGS. 9 and 11, certain models of mobility devices 14 lack an undercarriage portion positioned so that the mobility device 14 may be retained with one or more of the L-shaped members 40. For example, one model of the JAZZY® power chair has a leg rest feature, the creation of which results in the omission of a portion of the undercarriage that would otherwise be positioned under one of more of the L-shaped members 40. Referring first to FIG. 9, reference FIG. 100 refers to a portion of the undercarriage of a mobility device 14 of this particular type. It is necessary to provide an extension perpendicularly from the undercarriage portion 100 so that this particular mobility device 14 may be retained by one or more of the L-shaped members 14. The extension 110 comprises a tube member 120, an L-shaped lip portion 130, and an L-shaped removable plate 140. The extension 110 is secured in position by placing the L-shaped lip portion 130 over the undercarriage portion 100 as shown in FIG. 9, by placing the L-shaped removable plate under the undercarriage portion 100 so as to be in line with the L-shaped lip portion 130, and to secure the L-shaped plate 140 relative to the tube member 120 and the undercarriage portion 100 with a screw 150 which passes through an opening 160 in the L-shaped plate 140.

Referring now to FIG. 11, shown is an undercarriage portion 200 of another type of mobility device 14. An example of a mobility device 14 having an undercarriage portion 200 of this dimension is a JAZZY® power chair having a remote control feature. The undercarriage portion 200 has a projection 210, into which an extension 220 of appropriate dimension may be inserted. The extension 220 may be secured into position using a screw 230 that is inserted through an opening 240 in the in the projection 210.

Figure 10:
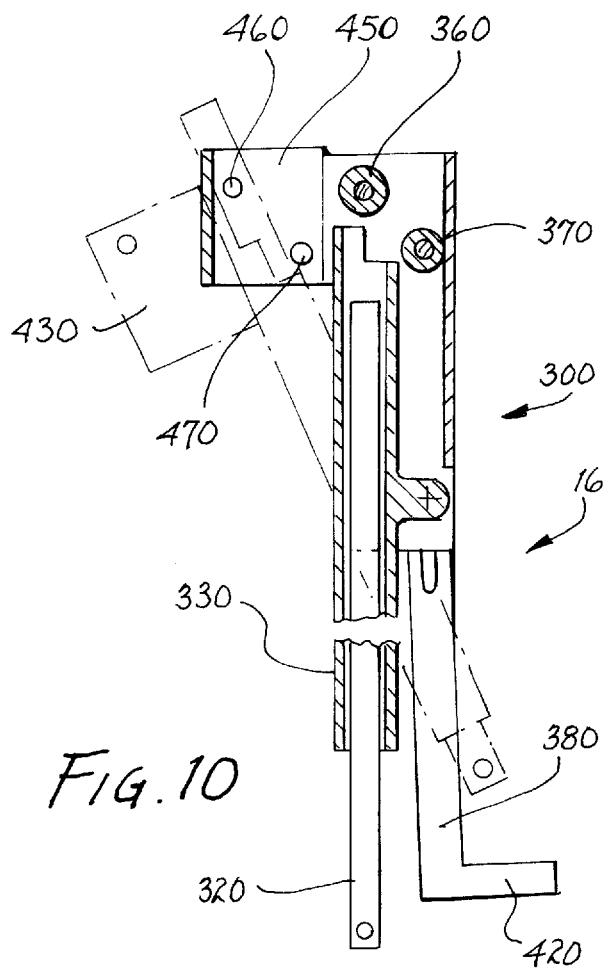
FIG. 10 is a side cross-sectional view of the lifting apparatus portion of the transporting apparatus of FIG. 6 taken along line 10—10.

Referring now to FIGS. 1, 3, 4, 6 and 10, the locking apparatus 300 of the present invention is shown. While other transport apparatuses are capable of folding automatically when a mobility device is not present on the platform—a feature of the present invention as well—the apparatus of the present invention also has the capability of mechanically locking the platform 12 in an up position proximate the lifting apparatus 16. The locking apparatus 300 comprises a piston 310, which is coupled to an extension 320, which extension 320 is slidably retained within a housing 330. Rotatably coupled to housing 330 is an outer housing 340, which rotates about bolt 350. As shown in FIG. 10, located in an upper portion of the outer housing 340 is a first roller 360 located nearer the side that is distal the bolt 350, and slightly below the roller 360 and located nearer the side that is proximate the bolt 350 is a second roller 370. Slidably retained to the outer housing 340 is a locking leg 380, which is capable of sliding in a vertical direction relative to the outer housing 340 along bolts 390, which are retained within grooves 400. The housing 330 is rotatably coupled to the lifting apparatus 16 along bolt 410.

At a distal end of the locking leg 380, there is located a projection 420. At the proximate end of the locking leg 380, there is a plate 430 having a substantially U-shaped opening 440 therein. Attached at a proximate end of the housing 330 is a substantially rectangular member 450, which member 450 has located thereon a bolt 460 and a bolt 470. Bolt 470 is substantially parallel to the roller 370, while the bolt 460 is substantially parallel to the roller 360. A pair of springs 480 are coupled on both sides to the exposed ends of bolt 460 and roller 360.

The locking apparatus 300 operates in the following manner. When the platform 12 is lifted by the lifting apparatus 16, piston 310 will travel in an upwards direction. If a mobility device is not present on the platform 12, the platform 12 will ascend in a parallel manner while the springs 480 maintain the member 450 and the outer housing 340 in an adjacent position. As the platform 12 proceeds higher, a bolt 490 (see FIG. 1) on the platform 12 will contact the projection 420. This will cause the locking leg 380 to travel upward, until the bolt 470 enters the U-shaped opening 440 as shown in FIG. 3. At this point, the platform 12 will be locked in position relative to the lifting apparatus 16.

If a mobility device 14 is present on the platform 12, the weight of the mobility device 14 will cause the extension 320 to force apart the springs 480, causing the outer housing 340 to rotate away from the member 450 along bolt 350. This rotation will prevent the bolt 470 from entering the U-shaped opening 440 and will prevent the plate 430 from contacting the bolt 470, as shown in FIG. 10.

Operation of the Invention

The transport apparatus 10 of the current invention may be used to lift and transport a mobility device 14. To lift a mobility device 14, the user will first wheel or drive the mobility device 14 onto the ramps 22 from side A of the platform 12. The anti-tip wheels 20B and the drive wheels 18 will first ascend the ramps 22, and the drive wheels 18 will enter the wheel wells 24 and 25, coming to rest on the centering devices 28. The anti-tip wheels 20B will pass next to the wheel wells 24 and 25, along support wheel paths 26, and down the opposing ramps 22. The user will stop the mobility device 14 when the drive wheels 18 are each in their respective wheel wells 24 and 25, resting on the centering devices 28.

The user will next activate the lifting apparatus 16 of the present invention, causing the L-shaped members 40 to secure the mobility device 14 to the platform 12, as shown in FIGS. 7 and 8 and as described above. When the platform 12 has been raised to a secure position for travel, the lifting apparatus 16 is turned off. The user may then, optionally, further secure the mobility device 14 to the eyelets 62 with bungee cords, cables, or like devices.

When the user is prepared to unload the mobility device 14, the process is reversed. If bungee cords, cables or like devices have been used to further secure the mobility device 14 to the platform 12, those devices are removed. The lifting apparatus 16 lowers the platform 12 until the platform 12 reaches the ground. As the platform 12 is lowered, the L-shaped members 40 rotate in the opposite direction, until they are fully open and are no longer in position to prevent the movement of the mobility device 14 from the platform 12. The drive wheels 18 will settle on the ground, allowing the platform 12 to continue to descend until it also rests on the ground. At this point, the mobility device 14 may be driven off of the platform 12 from Side B or backed off from Side A.

While the invention has been particularly shown and described with reference to preferred embodiments thereof, it will be understood by those skilled in the art that the foregoing and other changes in form and details may be made therein without departing from the spirit and scope of the invention.

We claim:

1. An apparatus for transporting mobility devices comprising, in combination:
    a mobility device having two relatively large wheels;
    a support platform for said mobility device comprising:
        loading means for permitting said mobility device to be located on said support platform;
        first and second wheel wells located between said loading means, said first and second wheel wells each having a width greater than a width of each of said relatively large wheels;
        means located within each of said first and second wheel wells for substantially centering said relatively large wheels; and
        retaining means for retaining a bottom portion of said mobility device to said support platform;
    lifting means attached to said support platform proximate said first wheel well for lifting said support platform; and
    means for attaching said lifting means to a vehicle.

2. The apparatus of claim 1 wherein said mobility device further comprises at least two relatively small wheels.

3. The apparatus of claim 1 wherein said wheel wells are substantially rectangle-shaped.

4. The apparatus of claim 2 wherein said loading means comprises:
    a first pair of ramp members substantially aligned with said first and second wheel wells on a first side of said support platform wherein each of said ramp members is aligned with one of said two relatively large drive wheels and one of said at least two relatively small wheels;
    a second pair of ramp members substantially aligned with said first and second wheel wells on a second side of said support platform wherein each of said ramp members is aligned with one of said two relatively large wheels and one of said at least two relatively small wheels; and
    path means joining said first and second pairs of ramp members for permitting said relatively small wheels to pass adjacent said first and second wheel wells during loading and unloading of said mobility device.

5. The apparatus of claim 3 wherein said first wheel well has a width of between about three inches and about three and one-half inches.

6. The apparatus of claim 3 wherein said first wheel well has a width of about three and one-quarter inches.

7. The apparatus of claim 5 wherein said second wheel well has a width of between about three and three-quarters inches and about four and one-quarter inches.

8. The apparatus of claim 6 wherein said second wheel well has a width of about four inches.

9. The apparatus of claim 3 wherein each said means located within each of said first and second wheel wells for substantially centering said drive wheels comprise:
    a pair of substantially stirrup-shaped members rotatably coupled to said support platform and located proximate short sides of said wheel wells; and
    spring means for maintaining said stirrup-shaped members in a substantially horizontal position when said relatively large wheels are not present in said wheel wells and to maintain said stirrup-shaped members in contact with said relatively large wheels when said relatively large wheels are present in said wheel wells.

10. The apparatus of claim 1 wherein said support platform further comprises a plurality of eyelets.

11. The apparatus of claim 1 wherein said retaining means comprises:
    at least one substantially L-shaped member rotatably coupled to said support platform;
    said substantially L-shaped member dimensioned to retain a bottom portion of said mobility device; and
    rotation means coupled to said at least one substantially L-shaped member for rotating said L-shaped member from a position substantially parallel to said support platform to a substantially ninety degree angle relative to said support platform wherein a portion of said L-shaped member extends over a portion of said bottom portion of said mobility device.

12. The apparatus of claim 11 further comprising means coupled to said bottom portion of said mobility device for permitting said retaining means to retain said bottom portion.

13. A method for transporting mobility devices comprising the steps of:
   providing a mobility device having two relatively large wheels;
   providing a support platform for said mobility device comprising:
      loading means for permitting said mobility device to be located on said support platform;
      first and second wheel wells located between said loading means, said first and second wheel wells each having a width greater than a width of each of said relatively large wheels;
      means located within each of said first and second wheel wells for substantially centering said relatively large wheels; and
      retaining means for retaining a bottom portion of said mobility device to said support platform;
   providing lifting means attached to said support platform proximate said first wheel well for lifting said support platform; and
   providing means for attaching said lifting means to a vehicle.

14. The method of claim 13 wherein said mobility device further comprises at least two relatively small wheels.

15. The method of claim 13 wherein said wheel wells are substantially rectangle-shaped.

16. The method of claim 14 wherein said step of providing said loading means further comprises the steps of:
   providing a first pair of ramp members substantially aligned with said first and second wheel wells on a first side of said support platform wherein each of said ramp members is aligned with one of said two relatively large drive wheels and one of said at least two relatively small wheels;
   providing a second pair of ramp members substantially aligned with said first and second wheel wells on a second side of said support platform wherein each of said ramp members is aligned with one of said two relatively large wheels and one of said at least two relatively small wheels; and
   providing path means joining said first and second pairs of ramp members for permitting said relatively small wheels to pass adjacent said first and second wheel wells during loading and unloading of said mobility device.

17. The method of claim 15 wherein said step of providing means located within each of said first and second wheel wells for substantially centering said drive wheels further comprises the steps of:
   providing a pair of substantially stirrup-shaped members rotatably coupled to said support platform and located proximate short sides of said wheel wells; and
   providing spring means for maintaining said stirrup-shaped members in a substantially horizontal position when said relatively large wheels are not present in said wheel wells and to maintain said stirrup-shaped members in contact with said relatively large wheels when said relatively large wheels are present in said wheel wells.

18. The method of claim 13 wherein said step of providing retaining means further comprises the steps of:
   providing at least one substantially L-shaped member rotatably coupled to said support platform;
   said substantially L-shaped member dimensioned to retain a bottom portion of said mobility device; and
   providing rotation means coupled to said at least one substantially L-shaped member for rotating said L-shaped member from a position substantially parallel to said support platform to a substantially ninety degree angle relative to said support platform wherein a portion of said L-shaped member extends over a portion of said bottom portion of said mobility device.

* * * * *